Nov. 8, 1932.  J. V. GIESLER  1,886,803
TUBULAR VESSEL AND METHOD OF MANUFACTURE
Filed Feb. 4, 1929
Fig. 1.
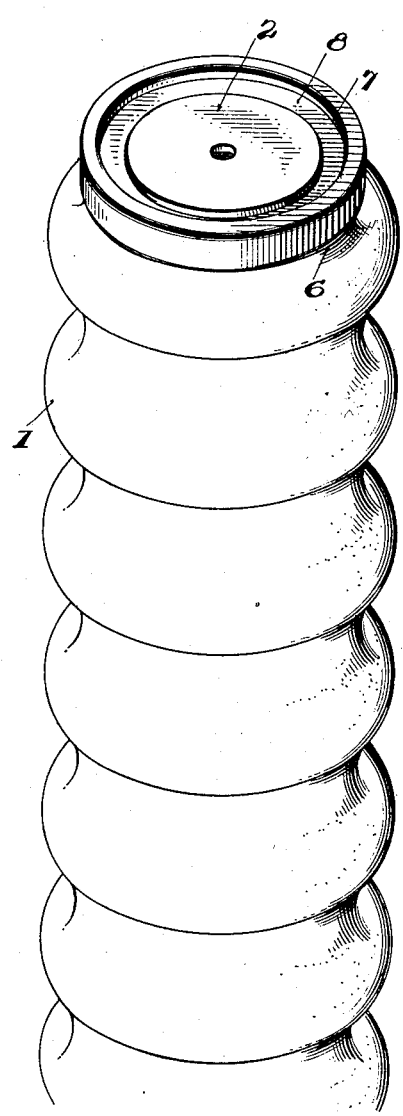
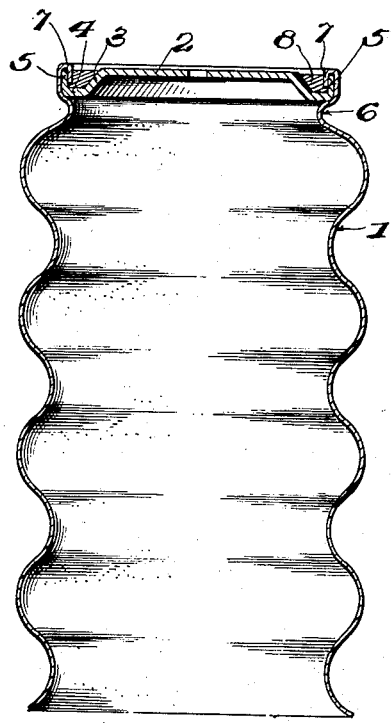
Fig. 3.
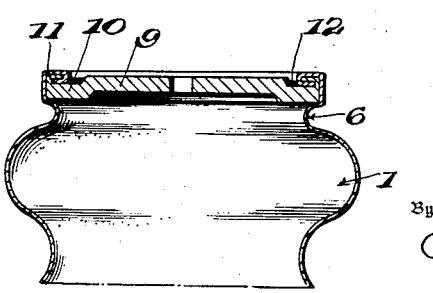
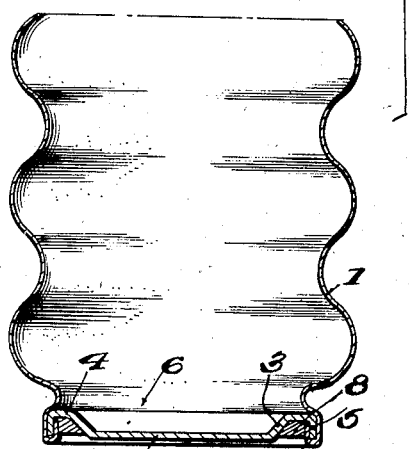
Fig. 2.
Inventor
Jean V. Giesler
By Cameron, Kerkam and Sutton.
Attorneys Patented Nov. 8, 1932

1,886,803

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

TUBULAR VESSEL AND METHOD OF MANUFACTURE

Application filed February 4, 1929. Serial No. 337,463.

This invention relates to the manufacture of tubular metallic vessels, and more particularly to a method of securing a head in a tubular corrugated metallic wall or bellows and to the resulting product.

One of the objects of the invention is to provide a novel method for attaching a disk-like head of a tubular corrugated metallic wall which is efficient, and economical in practice, and lends itself readily to quantity production.

Another object is to provide a novel method and means of sealing a preformed head in the end of a tubular metallic wall to form a fluid-tight joint.

Another object is to provide a novel method of forming a novel seamed and soldered fluid-tight joint between a head and a tubular wall which may be performed by automatic mechanical operations and results in a product having superior strength and efficiency.

Another object is to provide a method for attaching a disk-like head to a metallic bellows by soldering or brazing which eliminates the difficulty heretofore experienced in keeping the material used in the soldering or brazing operation from getting onto and injuring the thin metal of which the bellows wall is composed.

A further object is to provide a novel form of fluid tight joint between a head and a tubular wall which is strong and permanent, which does not wear or work loose and leak, and which may be formed economically and efficiently.

Other objects will appear more fully as the description of the invention proceeds.

In the practice of the novel method, according to one embodiment thereof which will be described for purposes of exemplification, a head or disk, preferably of comparatively thick, rigid metal, is preformed to provide a turned up peripheral flange substantially perpendicular to the plane of the disk and a shallow narrow groove in the face of the disk adjacent the peripheral flange. The head so formed is then inserted in the end of a tubular metallic wall to which it is to be attached and the end of the surrounding metallic wall is seamed or curled inwardly around the turned up flange. This operation may be carried out mechanically in any suitable type of apparatus, as, for example, by means of punches and dies of any suitable type, or by a spinning operation, etc. The preformed head having been thus rigidly mounted and secured in the end of the tubular wall, the groove adjacent the peripheral flange is partially or completely filled with solder whereby the joint is made fluid-tight. The soldering operation likewise may be performed by any suitable apparatus and may be carried out entirely mechanically and automatically. Where the method is practiced in the manufacture of metallic corrugated bellows, the head may be attached to the wall at any stage in the manufacture of the latter, the corrugations being completed by hydraulic operations, for example, or the wall may be completely corrugated hydraulically or by rolling or otherwise and the head subsequently secured therein.

Two embodiments illustrating the novel method, as practiced in the manufacture of corrugated metallic bellows, are shown in the accompanying drawing, but it is to be expressly understood that said drawing is for purposes of illustration only, and is not designed as a definition of the limits of the invention, reference being had to the appended claims for this purpose.

In said drawing—

Fig. 1 is a perspective view of one end of a partly finished bellows embodying the invention;

Fig. 2 is a mid-section through the partly finished bellows of Fig. 1 illustrating the invention; and Fig. 3 illustrates another embodiment of the invention.

Referring now to Figs. 1 and 2 of the drawing, a flexible corrugated wall 1 is shown in a partially completed state, the corrugations thereof having been begun but not yet deepened to their full extent. At this point in the manufacture thereof, it may be desired to secure a head permanently in the end of the tubular wall and then to complete the corrugating operations by hydraulic operations or otherwise. A head 2 of suitable diameter is preformed for attachment to the wall 1, the peripheral portion thereof being bent downwardly at 3 out of the plane of the body of the head 2, and then extending horizontally at 4 for a short distance, and then being turned up to form a peripheral flange 5. The depressed portions 3 and 4, together with the flange 5, form a groove adjacent the periphery of the head.

While the head 2 may be positioned in the end of the tube in any suitable manner, as by the use of a suitable punch or the like, it is preferred to form an internal bead 6 in the wall 1 which is of smaller diameter than said head and on which the head 2 may rest. This bead may be formed, for example, by rolling. The tube and its head are now assembled and the end portion 7 of the tubular wall, which projects beyond the flange 5 of the head, is bent or curled inwardly and downwardly around the flange 5, as shown in Fig. 2. This operation may be performed by a suitable die, adapted to surround the end of the tubular wall and provided with suitable surfaces which curl the end thereof to the position shown, or by a suitable spinning operation, etc. The groove adjacent the periphery of the head 2, formed by the depressed periphery 3, 4 thereof and the flange 5, is now filled with solder 8 in any suitable manner whereby the joint is made fluid-tight.

In some instances it may be desirable to form a lock seam between the flexible wall 1 and its head, and in such cases the flange 5, with the end of the tubular wall curled around the same as shown in Fig. 2, is bent inwardly and flattened down against the periphery of the head to the position shown in Fig. 3. In some instances it may likewise be desirable to form the head of thicker and more rigid material so as to impart greater strength and rigidity to the finished bellows. As seen in Fig. 3, a head 9 of thick, heavy material is shaped in any suitable manner to provide a peripheral portion which is depressed below the plane of said head, as by depressing the peripheral portion 10 thereof, and is provided with a peripheral flange 11 which is preferably made thinner than the head 9. The thin flange 11, being comparable in flexibility to the wall 1, bends readily to the finished position shown in Fig. 3 without pinching or cutting off the wall 1 during the curling operation. The groove formed between the raised or thicker central portion of the head 9 and the curled over flange 11 and surrounding wall is finally filled with solder 12 to insure that the joint shall be fluid-tight.

The method of sealing a head in the end of a tubular corrugated wall as above described provides a joint between the head and wall the strength of which is provided by the wall and is not dependent in any way upon soldering or brazing of the head to the wall. At the same time the addition of the solder filling the peripheral groove insures that the joint shall be fluid-tight, and the bead being fixed tightly between the head in the flexible wall and the curled over portion of said wall will not work loose and destroy the fluid-tight seal. This method, wherein the head is formed with a peripheral flange and a groove adjacent thereto, makes it possible to form the seam and apply the solder thereto in any suitably designed apparatus, and these operations can be performed mechanically and automatically since the solder need only be poured into the groove and there is no danger of the soldering or brazing material running into or onto the bellows. These advantages result in material saving of time and labor, permitting quantity production at very low cost. Moreover, the head may be attached to said bellows at an intermediate stage in the manufacture thereof, and the subsequent cold working of the metal in completing the corrugations prevents any injury to the temper of the metal in the finished wall due to the heat of soldering or brazing.

While the practice of the method constituting the invention has been illustrated and described with considerable particularity, it will be apparent that many variations thereof will occur to those skilled in the art which do not depart from the spirit of the invention. Reference is therefore to be had to the appended claims for a definition of the limits of the invention.

What is claimed is:

1. The method of closing a bellows tube to form a strong hermetic seal between a head and the lateral flexible wall of the completed tube which includes the steps of forming a head with an upstanding flange of thinner material than the body of said head and with an adjacent groove, positioning said head in the end of the tube, bending the end of the tube around the upstanding flange, and flowing solder into said groove to seal the joint between the end of the tube and the head.

2. The method of closing a bellows tube to form a strong hermetic seal between a head and the lateral flexible wall of the completed tube which includes the steps of forming a head with an upstanding flange of thinner material than the body of said head and with an adjacent groove, positioning said head in the end of the tube, bending the end of the tube around the upstanding flange, bending the flange with the tube end therearound down onto the head, and flowing solder into the groove to seal the joint between the head and tube end.

3. A bellows tube provided with a head having an upstanding peripheral flange, and an adjacent groove, said flange being of thinner material than the body of said head and said tube having its end folded around said upstanding flange and locked thereto by solder in said groove.

4. A bellows tube having a peripheral flange and a groove adjacent thereto, said flange being of thinner material than the body of said head and said tube having its end folded around said flange and said flange and tube end folded down onto said head and locked thereto by solder in said groove.

In testimony whereof I have signed this specification.

JEAN V. GIESLER.